United States Patent
Camarillo et al.

(10) Patent No.: US 11,485,210 B1
(45) Date of Patent: Nov. 1, 2022

(54) PROTECTIVE VEHICLE COVER

(71) Applicants: Jorge Camarillo, Signal Hill, CA (US); Glendi Camarillo, Signal Hill, CA (US)

(72) Inventors: Jorge Camarillo, Signal Hill, CA (US); Glendi Camarillo, Signal Hill, CA (US)

(*) Notice: Subject to any disclaimer, the term of this patent is extended or adjusted under 35 U.S.C. 154(b) by 142 days.

(21) Appl. No.: 16/998,126

(22) Filed: Aug. 20, 2020

(51) Int. Cl.
*B60J 11/06* (2006.01)

(52) U.S. Cl.
CPC ..................... *B60J 11/06* (2013.01)

(58) Field of Classification Search
CPC ........................................................ B60J 11/06
See application file for complete search history.

(56) References Cited

U.S. PATENT DOCUMENTS

| | | | | |
|---|---|---|---|---|
| 4,781,231 A * | 11/1988 | Garcia | ............... | B60J 11/06 224/543 |
| 4,799,728 A * | 1/1989 | Akers | ............... | B60J 11/00 296/136.11 |
| 4,805,957 A * | 2/1989 | Fletcher | ............... | B60J 3/0286 296/153 |
| D329,836 S * | 9/1992 | Meyers | ............... | D12/421 |
| 6,840,566 B2 * | 1/2005 | Bruton | ............... | B60N 2/783 296/153 |
| 7,404,589 B2 | 7/2008 | Carter | | |
| 9,402,369 B2 | 8/2016 | Burns Baker | | |
| 2015/0173325 A1 * | 6/2015 | Burns Baker | ............... | B60R 7/046 296/1.09 |

* cited by examiner

*Primary Examiner* — Joseph D. Pape
(74) *Attorney, Agent, or Firm* — Sanchelima & Associates, P.A.; Christian Sanchelima; Jesus Sanchelima

(57) ABSTRACT

A protective vehicle cover including a first panel assembly, a second panel assembly and a vehicle assembly is disclosed. A first panel drapes over a vehicle door exterior of a vehicle. The first panel assembly further includes a padded portion detachably mounted to the first panel. The padded portion may be secured to a window sill of a door of the vehicle. A pet may comfortably ride within the vehicle while resting their paws or head atop of the padded portion. Mounted detachably to a rear of the padded portion is a second panel. The second panel drapes over a vehicle door interior for protection against damage from pets. Importantly, the second panel includes a ballast or weighted material at a lower end to ensure that the second panel remains in place and draping over the vehicle door interior.

10 Claims, 6 Drawing Sheets

PROTECTIVE VEHICLE COVER

BACKGROUND OF THE INVENTION

1. Field of the Invention

The present invention relates to a protective vehicle cover and, more particularly, to a protective padded vehicle cover that shields an open window and door panel from damage from a pet traveling within the vehicle and out of the open window.

2. Description of the Related Art

Several designs for protective vehicle covers have been designed in the past. None of them, however, include a protective pad covering the open window and door panel of an automobile for use when a dog or other pet is traveling. The cover includes a rectangular fabric panel with integral padding which is placed over the open window sill and is secured to the exterior of the vehicle using magnets and which drapes down over the interior door panel and stays in place using a ballast or weighted material located near the bottom of the fabric panel.

Applicant believes that a related reference corresponds to U.S. Pat. No. 9,402,369 for a clip on pet supporting cushion for the window sill in an automobile. Applicant believes that another related reference corresponds to U.S. Pat. No. 7,404,589 for a window and door panel drape for a vehicle door to protect both the door panel and a dog during travel. None of these references, however, teach of a cover with integral padding that is placed over the open window sill and is secured to the exterior of the vehicle using magnets. Additionally, the cover drapes down over the interior door panel and stays in place using heavy material located near the bottom of the fabric panel.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a protective vehicle cover that protect a vehicle from damage to the door interior and window sill of the vehicle while a pet rides within.

It is another object of this invention to provide a protective vehicle cover that helps to provide comfort to pets riding within a vehicle.

It is still another object of the present invention to provide a protective vehicle cover that can be retrofitted onto vehicles.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
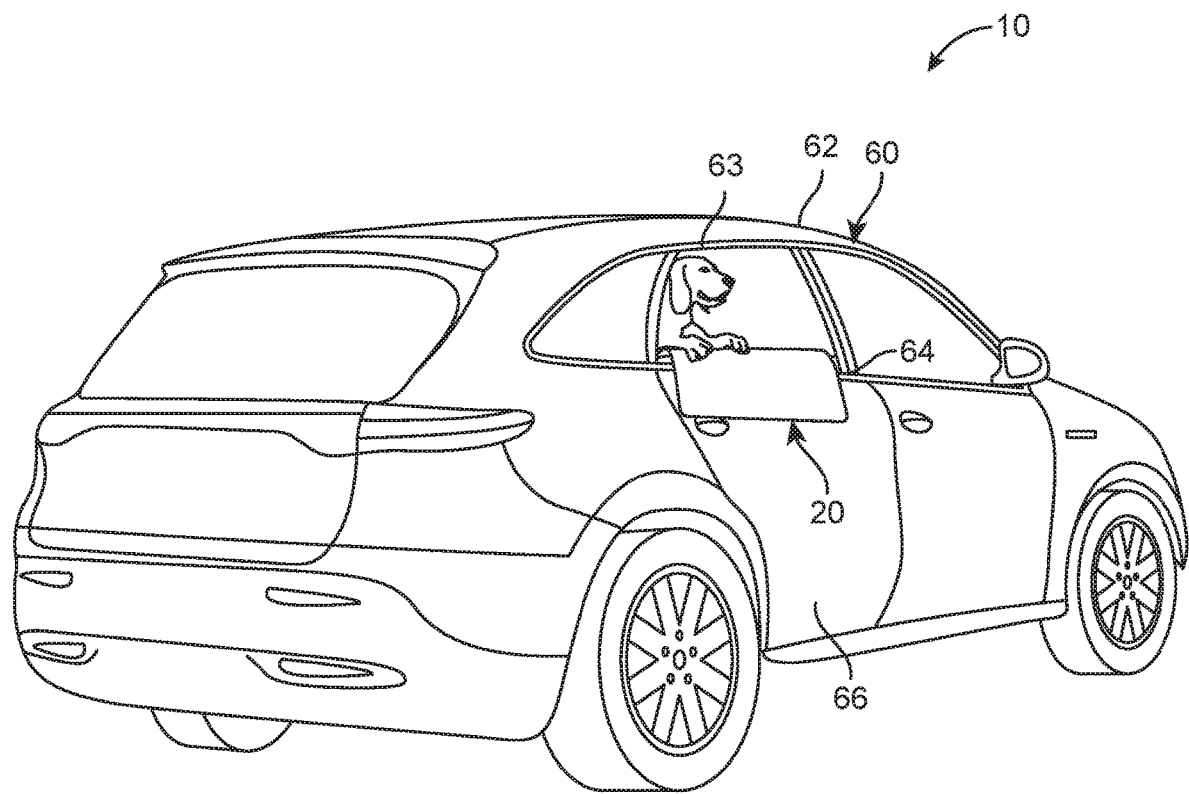
FIG. 1 represents an operational view in which protective vehicle cover 10 is mounted to a vehicle 62 of the vehicle assembly 62 at a window sill 64 thereof.
Figure 2:
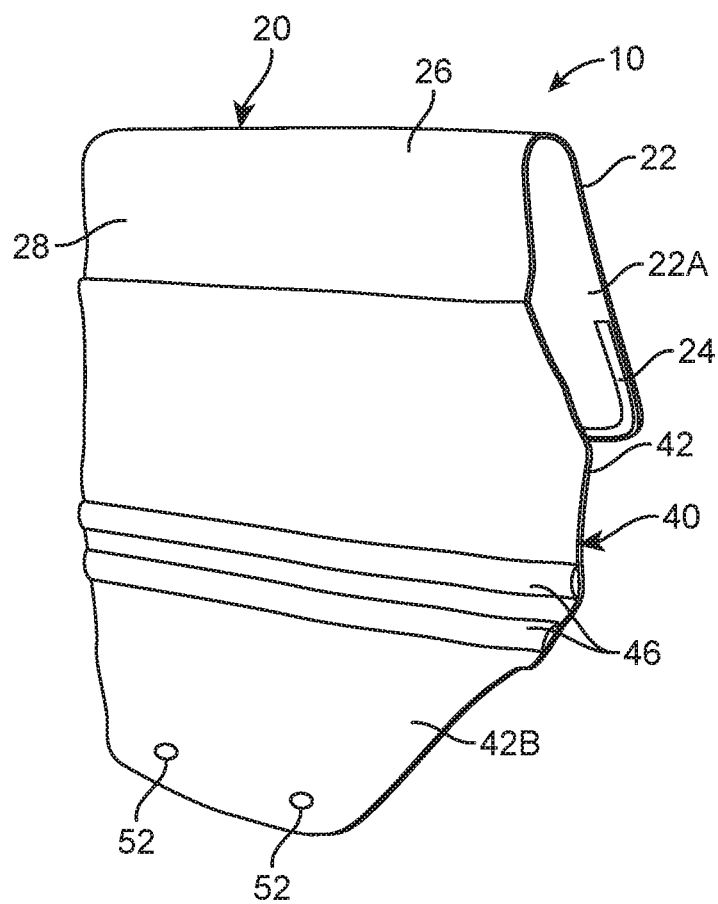
FIG. 2 shows an isometric view of the protective vehicle cover 10.

Referring now to the drawings, where the present invention is generally referred to with numeral 10, it can be observed that it basically includes a first panel assembly 20, a second panel assembly 40, and a vehicle assembly 60.

A protective vehicle cover 10, as best seen in FIG. 1, can be seen mounted to a vehicle 62 of vehicle assembly 60. More specifically, protective vehicle cover 10 can be seen draping over a door 63 of vehicle 62. More specifically, protective vehicle cover 10 may drape over a window sill 64 of vehicle 62 and over the window. It is to be understood that preferably, the window may be entirely recessed within the door panel of vehicle 62. Protective vehicle cover 10 drapes over door 63 and window sill such that protective vehicle cover drapes over a vehicle door exterior 66 and over a vehicle door interior 68. Once protective vehicle cover 10 is secured to door 63 of the vehicle 62, pets may comfortably rest upon the present invention while riding within vehicle 62. The pets may comfortably extend their head out through window sill 64 and atop of protective vehicle cover 10. Additionally, protective vehicle cover 10 may protect vehicle 62 from damage from the paws of the pet.

It can be best seen in FIGS. 1-5, that first panel assembly 20 may include a first panel 22. First panel 22 may include an interior side 22a and an exterior side 22b. Interior side 22a may be in constant abutting contact with vehicle door exterior 66 when protective vehicle cover 10 is mounted to door 63. First panel 22 may be made of materials or fabrics that are washable and reusable. In one embodiment, first panel 22 may be of a rectangular shape. First panel 22 may drape over door 63 such that door 63 is partially covered by first panel 22. It is to be understood that first panel 22 may be secured to window sill 64 such that the window of door 63 is entirely covered by first panel 22. Preferably, the window of door 63 may be entirely recessed within door 63 when first panel 22 is mounted to door 63. To allow for first panel 22 to remain in constant abutting contact with vehicle door exterior 66, first panel 22 may include magnets 24. More specifically, magnets 24 may be located on interior side 22a along periphery edges of first panel 22. In one embodiment, magnets 24 may be magnet strips. Magnets 24 may be evenly spaced apart or arranged in a U shaped configuration.

Figure 3:
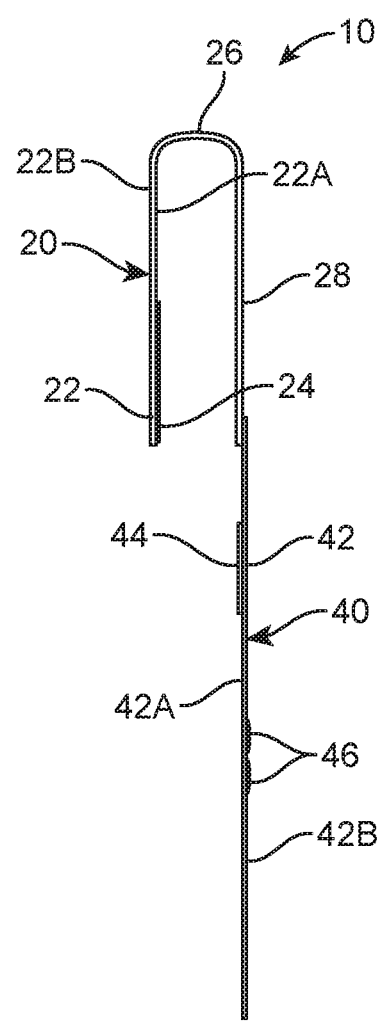
FIG. 3 illustrates a side view of the protective vehicle cover 10.
Figure 4:
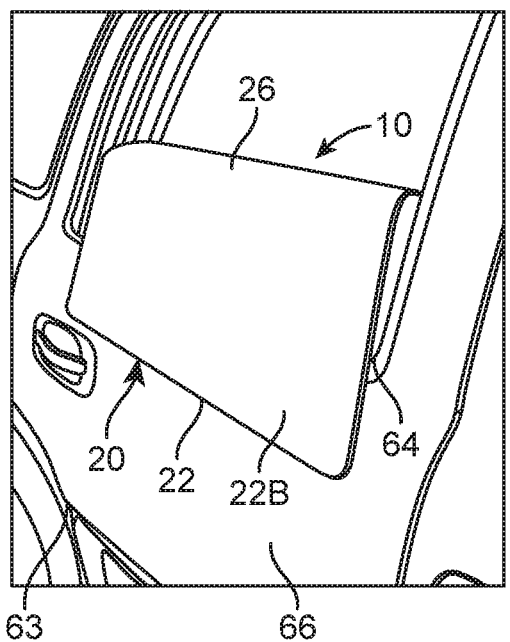
FIG. 4 is a representation of an zoomed in view of the exterior of vehicle 62 showing the first panel 22 mounted to the exterior of vehicle 62.
Figure 5:
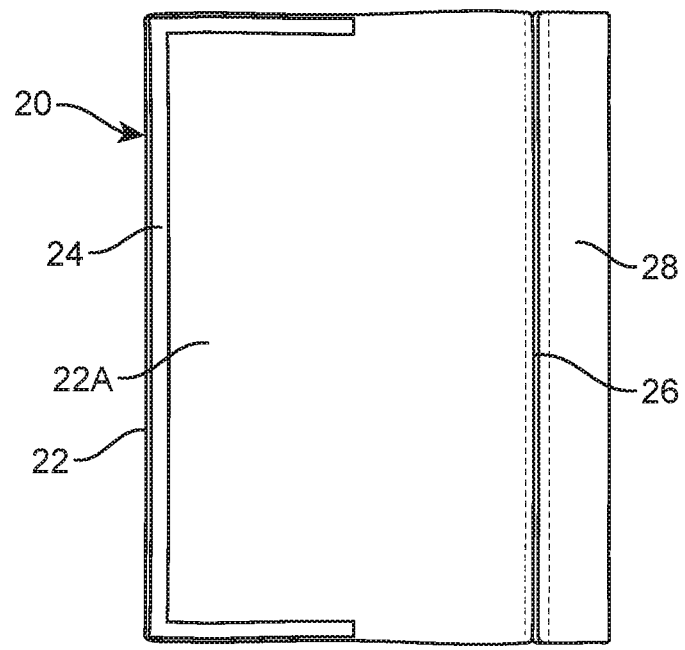
FIG. 5 represents an isometric view of interior side 22a of first panel 22.

Attached to a top portion of first panel 22 may be a padded portion 26. First panel 22 may be attached to a front side of padded portion 26, as best seen in FIG. 3. Padded portion 26 may be substantially U shaped, in one embodiment. Preferably, padded portion 26 may be made of a memory foam material. Padded portion 26 may rest atop of window sill 64 or window. Padded portion 26 may have a channel that extends the length thereof. The channel may be used to received window sill 64 therein. The channel helps to ensure that padded portion 26 remains atop of window sill 64. Padded portion 26 may extend the entire length of first panel 22. It is to be understood that padded portion 26 may provide comfortable to the pet resting thereon. Padded portion 26 may help the pet from being injured while riding within vehicle 62. Additionally, padded portion 26 may help to provide protection to vehicle 62. Padded portion 26 may protect window sill 64 and vehicle door interior 68 from damage.

As best seen in FIG. 3, at a rear side of padded portion 26 may be an attaching portion 28. Attaching portion 28 may extend an entire length of padded portion 26. Attaching portion 28 may drape downwardly from padded portion 26. Attaching portion 28 may be parallel to first panel 22. Additionally, attaching portion 28 may be shorter than first panel 22. It is to be understood that mounted to an outer attaching portion side may be a first panel fastener 32. First panel fastener 32 may extend the entire length of attaching portion 28. Preferably, first panel fastener 32 may be a hook and loop strap. Other fastening means such as snap buttons, sewing, buttons, adhesives, zippers, or the like may be suitable as well. Attaching portion 28 and first panel fastener 32 may be used to removably attach second panel assembly 40 to padded portion 26.

Figure 6:
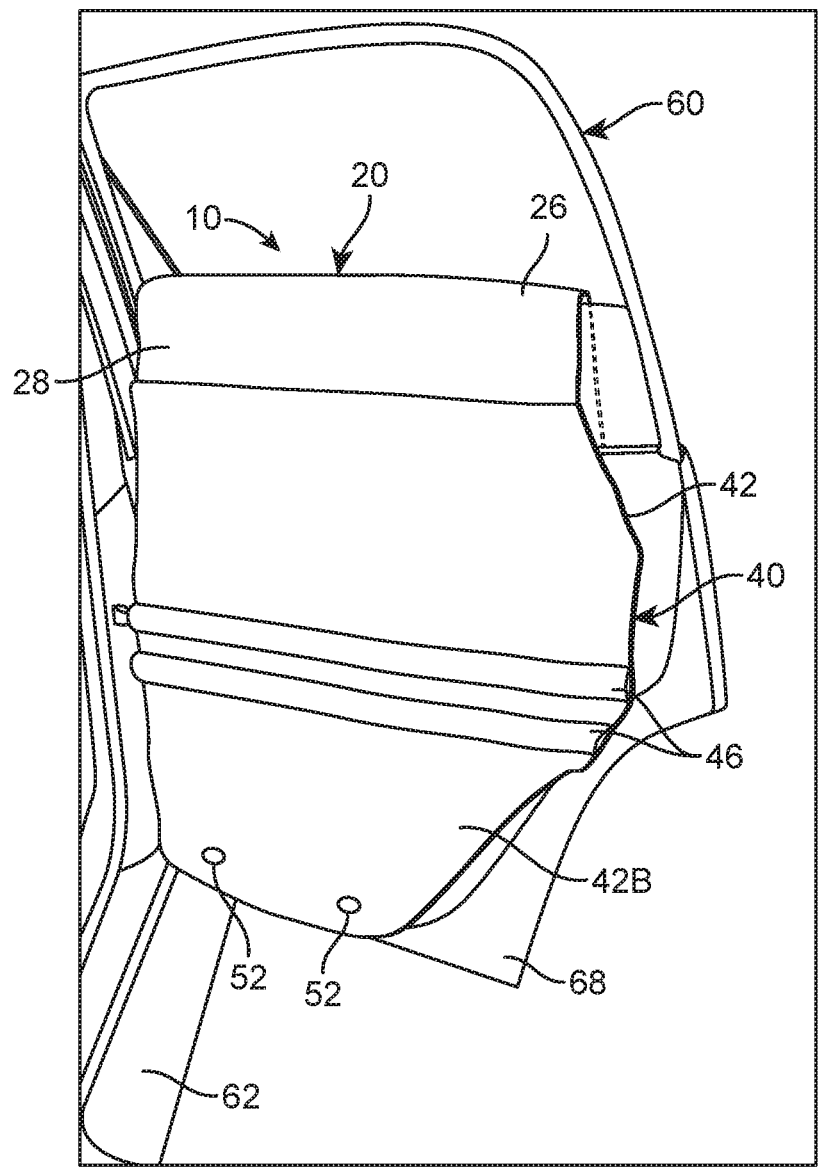
FIG. 6 shows an operational view of the interior of vehicle 62 showing second panel 42 mounted to the interior of vehicle 62.
Figure 7:
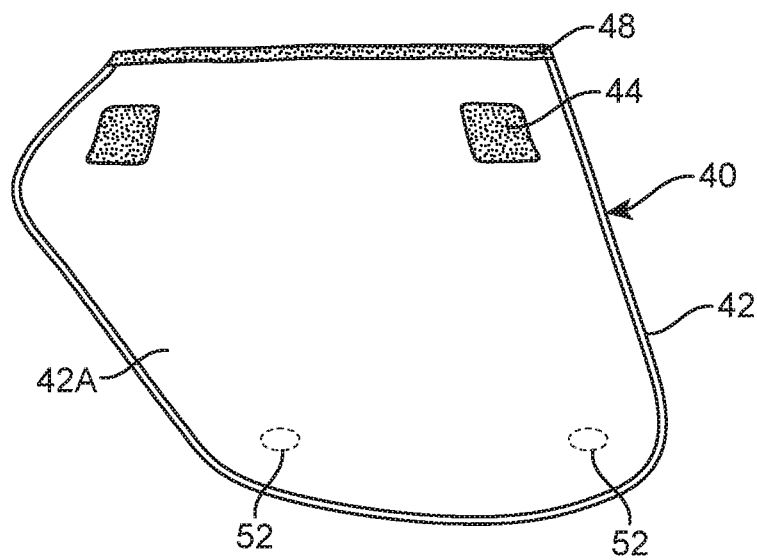
FIG. 7 illustrates an isometric view of inner side 42a of second panel 42.
Figure 8:
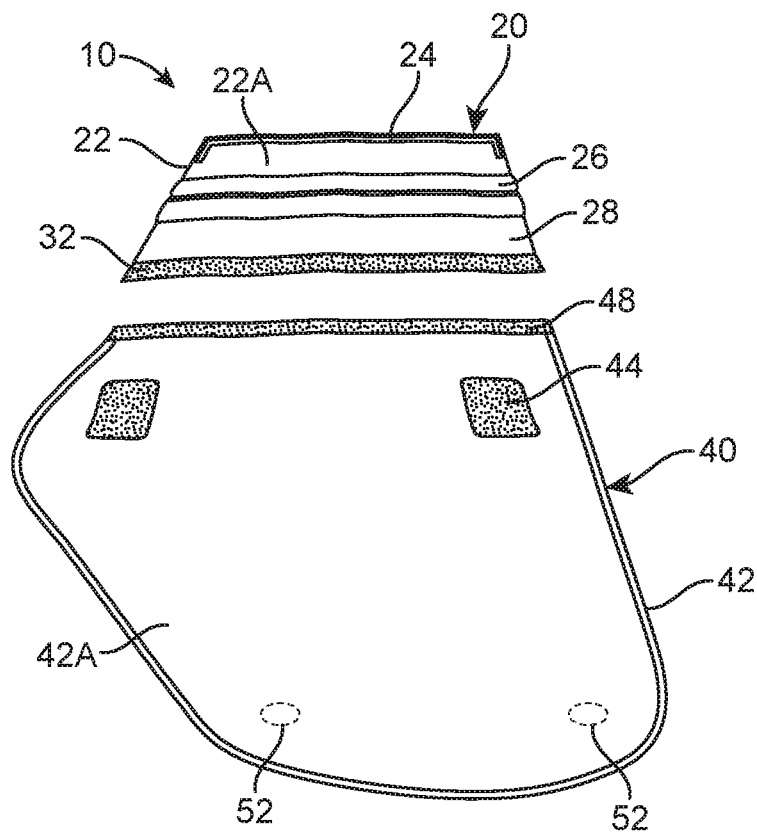
FIG. 8 is a representation of first panel 22 and second panel 42 detached from one another.
Figure 9:
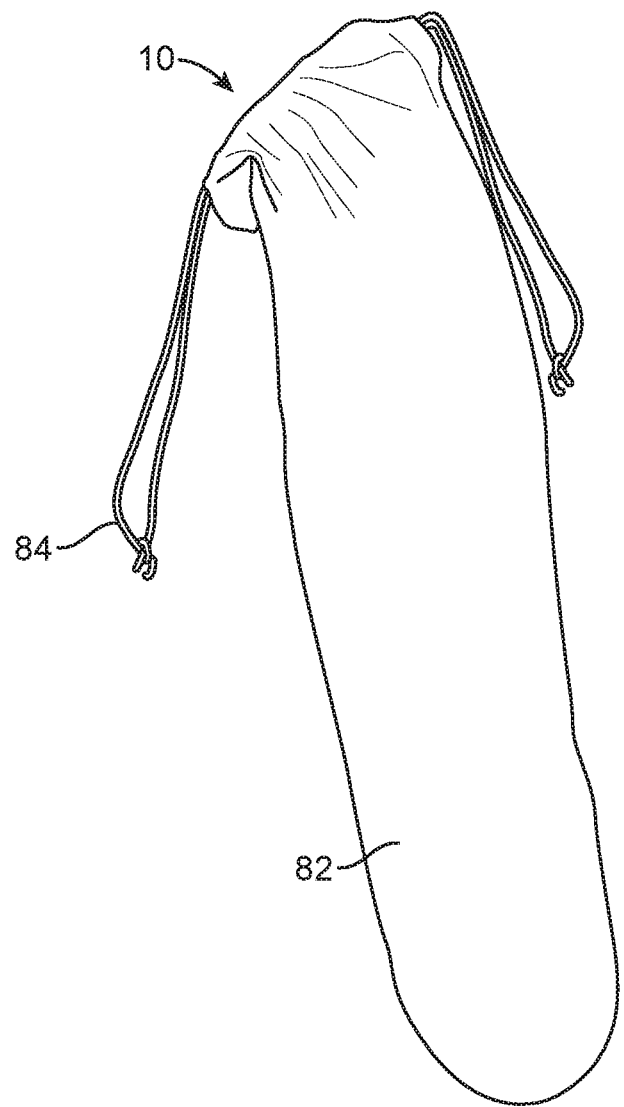
FIG. 9 shows an isometric view of the protective vehicle cover 10 stored within a carrying case 82.

As best seen in FIGS. 6-8, second panel assembly 40 may be used to protect vehicle door interior 68. The paws and nails of pets may make contact with second panel assembly 40 instead. Second panel assembly 40 may include a second panel 42 that may be in constant abutting contact with vehicle door interior 68 when in use. Second panel 42 may be of a shape that cooperates with the door panel on the inner side of door 63. It is to be understood that second panel 42 may be made of various materials. Second panel 42 may include an inner side 42a and an outer side 42b. Inner side 42a may be in direct and constant abutting contact with vehicle door interior 68. Outer side 42b may be of an abrasive material as to be durable despite being in constant contact with the pet. In one embodiment, second panel 42 may be made of a ballast or weighted material to better secure second panel 42 to door 63.

It can be seen that mounted to inner side 42a may be securing pads 44. In one embodiment, securing pads 44 may be mounted vertically along inner side 42a. Securing pads 44 may extend a partial height of second panel 42. Securing pads 44 may be spaced apart on inner side 42a. It can be seen that securing pads 44 may be parallel to each other. It is to be understood that securing pads 44 may preferably be made of a material with a high coefficient of friction. This helps to be second panel 42 secured to vehicle door interior 68. In an alternate embodiment, securing pads 44 may each include an adhesive thereon.

Mounted to outer side 42 may be pads 46. Pads 46 may extend the length of second panel 42. Pads 46 may provide support to the pet while they rest on the present invention. Preferably, pads 46 may extend horizontally. It is to be understood that pads 46 may be parallel to each other and evenly spaced apart. In one embodiment, pads 46 may be of different lengths. Pets may make use of pads to support themselves to be able to rest their head or paws upon padded portion 26.

To allow for second panel 42 to be detachable from attaching portion 28, a second panel fastener 48 may be attached to a top rear side of second panel 42. Second panel fastener 48 may extend the length of second panel 42. It is to be understood that first panel fastener 32 may cooperate with second panel fastener 48.

Secured within second panel 42 may be weights 52. Weights 52 may be made of a ballast or weighted material. Weights 52 may help to ensure that second panel 42 drapes along vehicle door interior 68. Weights 52 may further help second panel 42 to remain in place while pets climb thereon. It is to be understood that second panel 42 may alternatively be made of a weighted material.

For storage, first panel 22, padded portion 26 and second panel 42 may be received within a carrying case 82. It may be suitable for first panel 22, padded portion 26 and second panel 42 to be rolled within carrying case 82. Carrying case 82 may help to facilitate carrying and transportation of the present invention when not in use. It is to be understood that carrying case 82 may include a drawstring 84 for closing said carrying case.

Protective vehicle cover 10 may help to provide comfort to pets while riding within vehicle 62. Further, protective vehicle cover 10, may help to protect vehicle 62 and more specifically, vehicle door interior 68 from damage. Protective vehicle cover 10 may preferably drape over door 63 and more specially, window sill 64 or window, such that vehicle door exterior 66 is partially covered and vehicle door interior 68 is entirely covered.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a protective vehicle cover, comprising:
   a. a vehicle assembly including a vehicle with a door, said door including a window sill, a vehicle door interior and a vehicle exterior;
   b. a first panel assembly including a first panel, said first panel having an interior side, said interior side including magnets, said first panel having a padded portion mounted to said first panel, said padded portion attached to said window sill, said first panel draping down said door along said vehicle door exterior, said first panel secured to said vehicle door exterior with said magnets; and
   c. a second panel assembly including a second panel, said second panel including weights, said second panel mounted to said padded portion, said weights causing said second panel to drape down said vehicle door interior, said weights are built in a bottom portion of said second panel, said weights have an oval shape, said weight prevents movement of said second panel, said second panel adapted to allow a pet to climb onto said padded portion without damaging said vehicle or said vehicle door interior, wherein said first panel, said padded portion and said second panel are stored and transported within a carrying case, said carrying case including a drawstring for closing said carrying case, wherein mounted to said padded portion is an attaching portion, said attaching portion being entirely below said padded portion, wherein mounted to said attaching portion is a first panel fastener, said first panel includes an exterior side, said second panel includes an inner side and an outer side said inner side includes securing pads, said securing pads being spaced apart and parallel to each other, said securing pads include an adhesive thereon, said adhesive secure said inner side to said vehicle door interior.

2. The system of claim 1, wherein said magnets are magnetic strips arranged in a U-shaped configuration.

3. The system of claim 1, wherein said first panel fastener being hook and loop fasteners, said first panel fastener extending an entire length of said attaching portion.

4. The system of claim 1, wherein said first panel and said attaching portion are parallel to each other.

5. The system of claim 1, wherein said first panel and said interior side are in constant abutting contact with said vehicle door exterior, said second panel and said inner side are in constant abutting contact with said vehicle door interior.

6. The system of claim 1, wherein said outer side includes pads, wherein said pads extend an entire length of said second panel, said pads being of different lengths, said pads adapted to support said pet when climbing onto said padded portion said pads extend horizontally said pads have a half-cylindrical shape said pads are parallel to each other and evenly spaced apart.

7. The system of claim 1, wherein said second panel includes a second panel fastener along said inner side, said second panel fastener cooperating with said first panel fastener for securing said first panel and said second panel to said door.

8. The system of claim 7, wherein said second panel fastener extends an entire length of said second panel.

9. The system of claim 1, wherein said second panel is made of a ballast or weighted material.

10. A system for a protective vehicle cover, consisting of:
 a. a vehicle assembly including a vehicle with a door, said door including a window sill, a vehicle door interior and a vehicle exterior;
 b. a first panel assembly including a first panel, said first panel having an interior side, said interior side including magnets, said magnets are magnetic strips arranged in a U-shaped configuration, said first panel having a padded portion mounted to said first panel, said padded portion attached to said window sill, said first panel draping down said door along said vehicle door exterior, said first panel secured to said vehicle door exterior with said magnets; and
 c. a second panel assembly including a second panel, said second panel including weights, said second panel is made of a ballast or weighted material, said second panel mounted to said padded portion, said weights causing said second panel to drape down said vehicle door interior, said weights are attached to a bottom portion of said second panel, said weights have an oval shape, said weight prevents movement of said second panel, said second panel adapted to allow a pet to climb onto said padded portion without damaging said vehicle or said vehicle door interior, wherein said first panel, said padded portion and said second panel are stored and transported within a carrying case, said carrying case including a drawstring for closing said carrying case, wherein mounted to said padded portion is an attaching portion, said attaching portion being entirely below said padded portion, wherein mounted to said attaching portion is a first panel fastener, said first panel fastener is a hook and loop fastener, said first panel fastener extends an entire length of said attaching portion, said first panel and said attaching portion are parallel to each other, said first panel includes an exterior side, said second panel includes an inner side and an outer side, said inner side includes securing pads, said securing pads being spaced apart and parallel to each other, said securing pads include an adhesive thereon, said adhesive secure said inner side to said vehicle door interior, said outer side includes pads, said pads being spaced apart and parallel to each other, said pads extend an entire length of said second panel, said pads being of different lengths, said pads adapted to support said pet when climbing onto said padded portion, said pads extend horizontally, said pads have a half-cylindrical shape.

\* \* \* \* \*